United States Patent Office 2,727,458
Patented Dec. 20, 1955

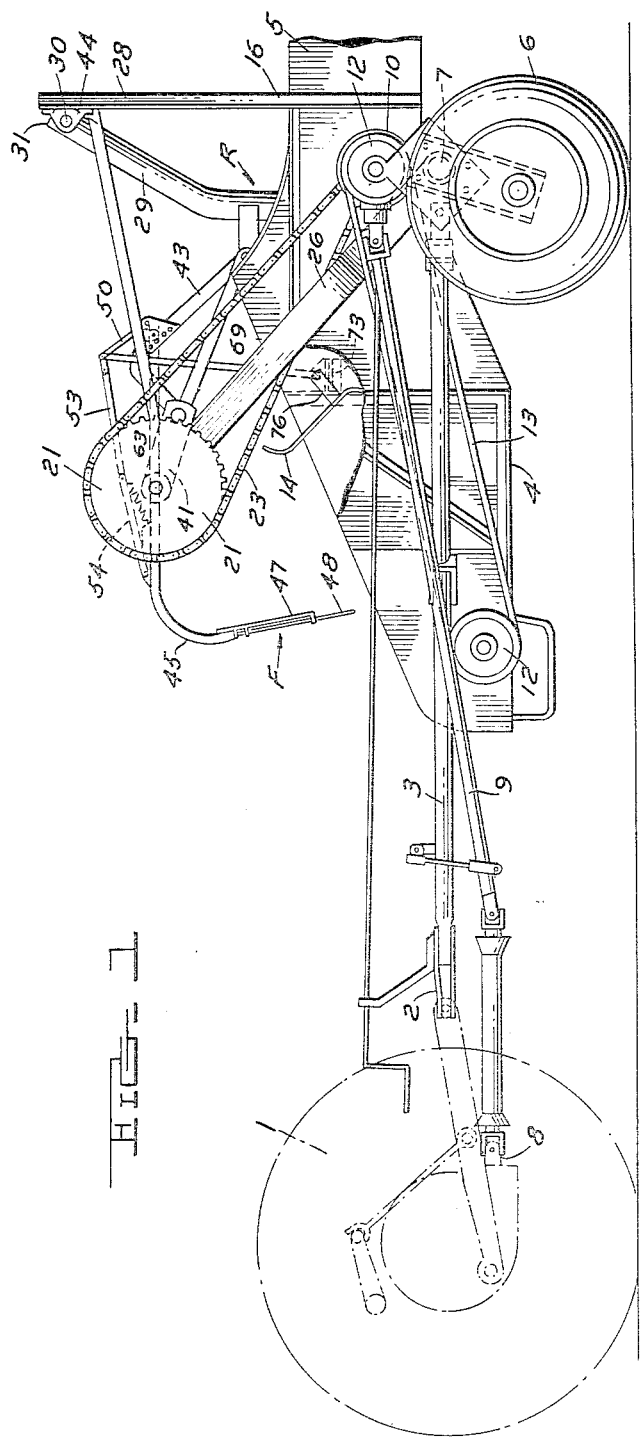

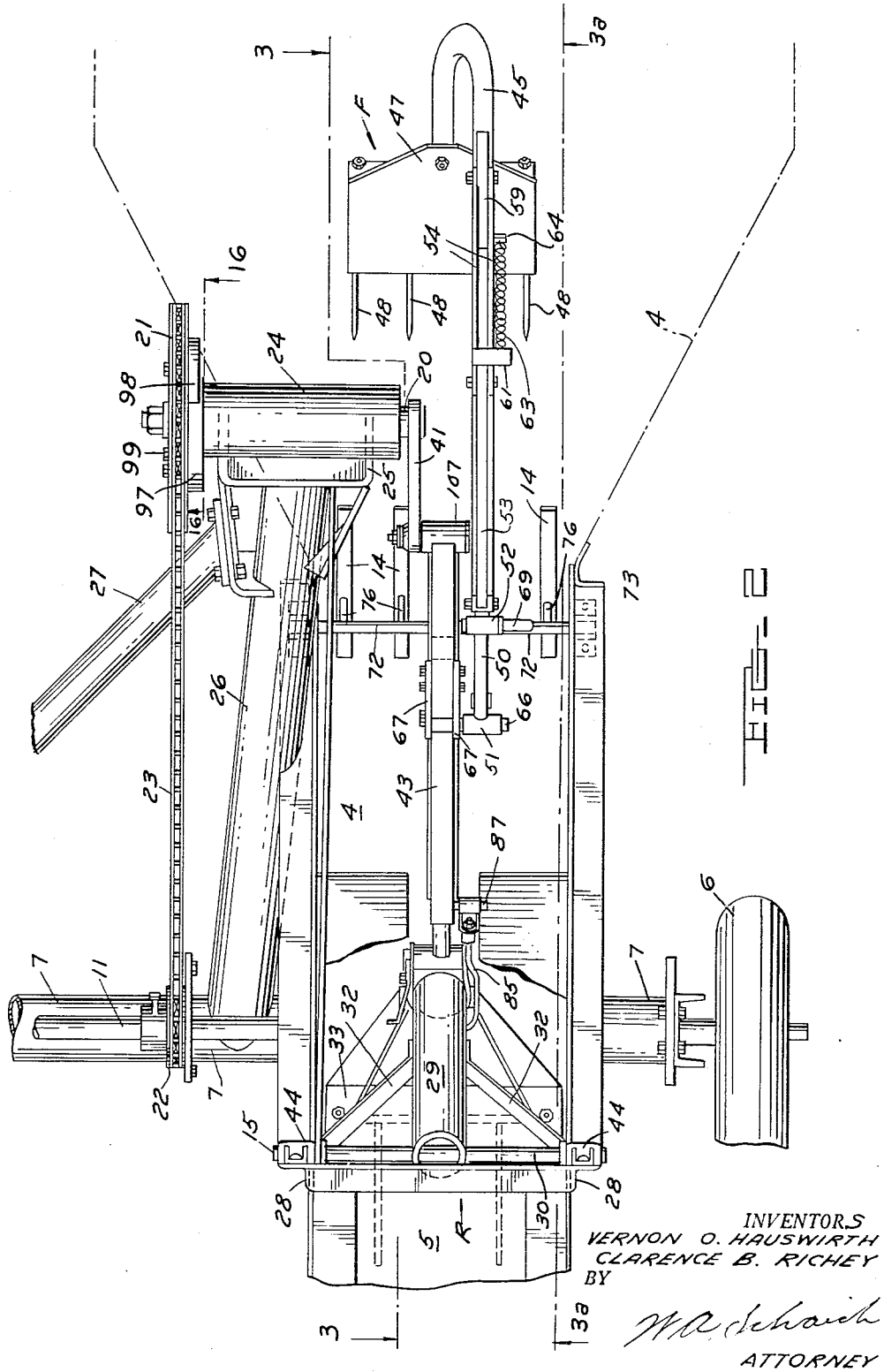

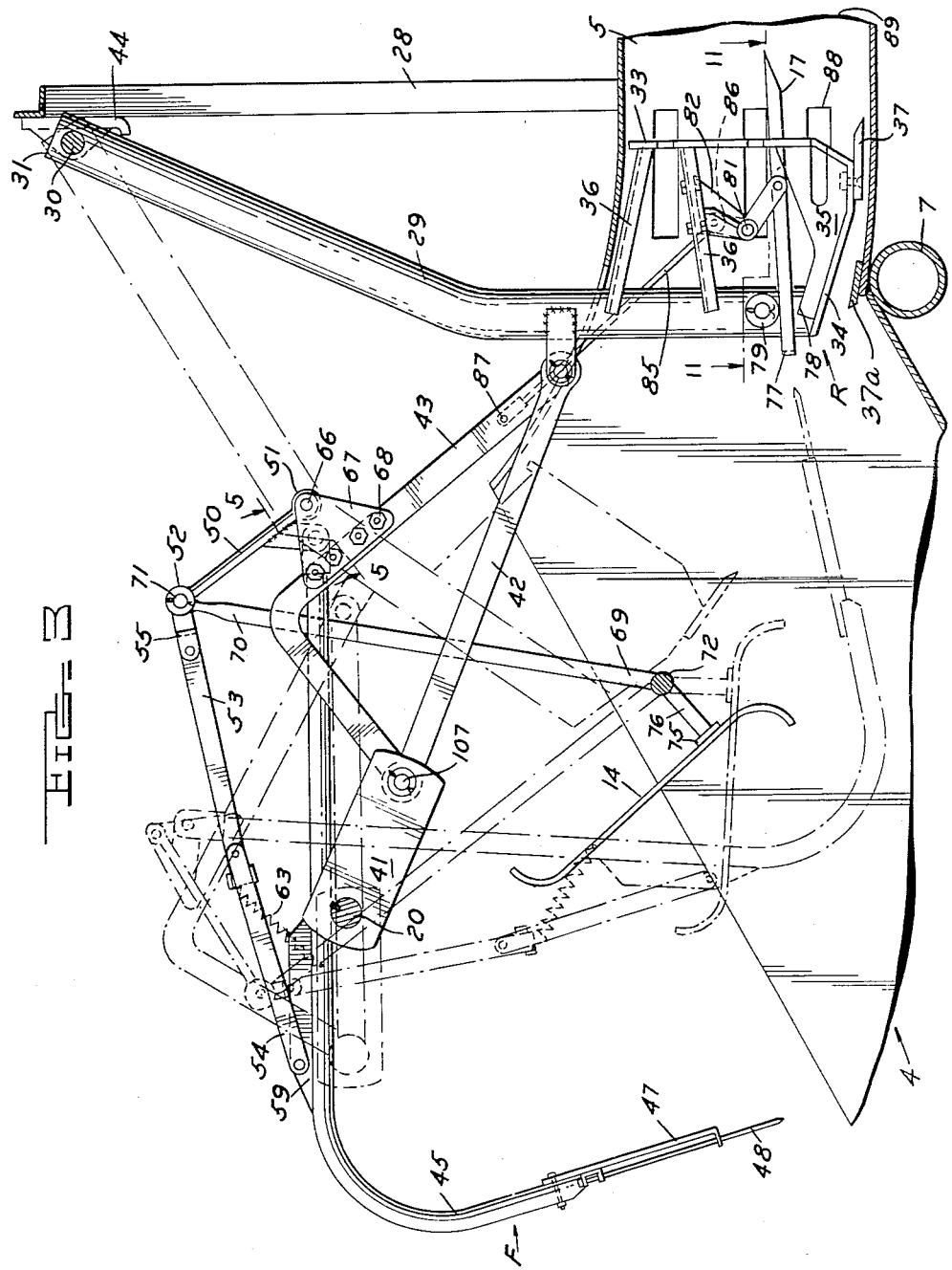

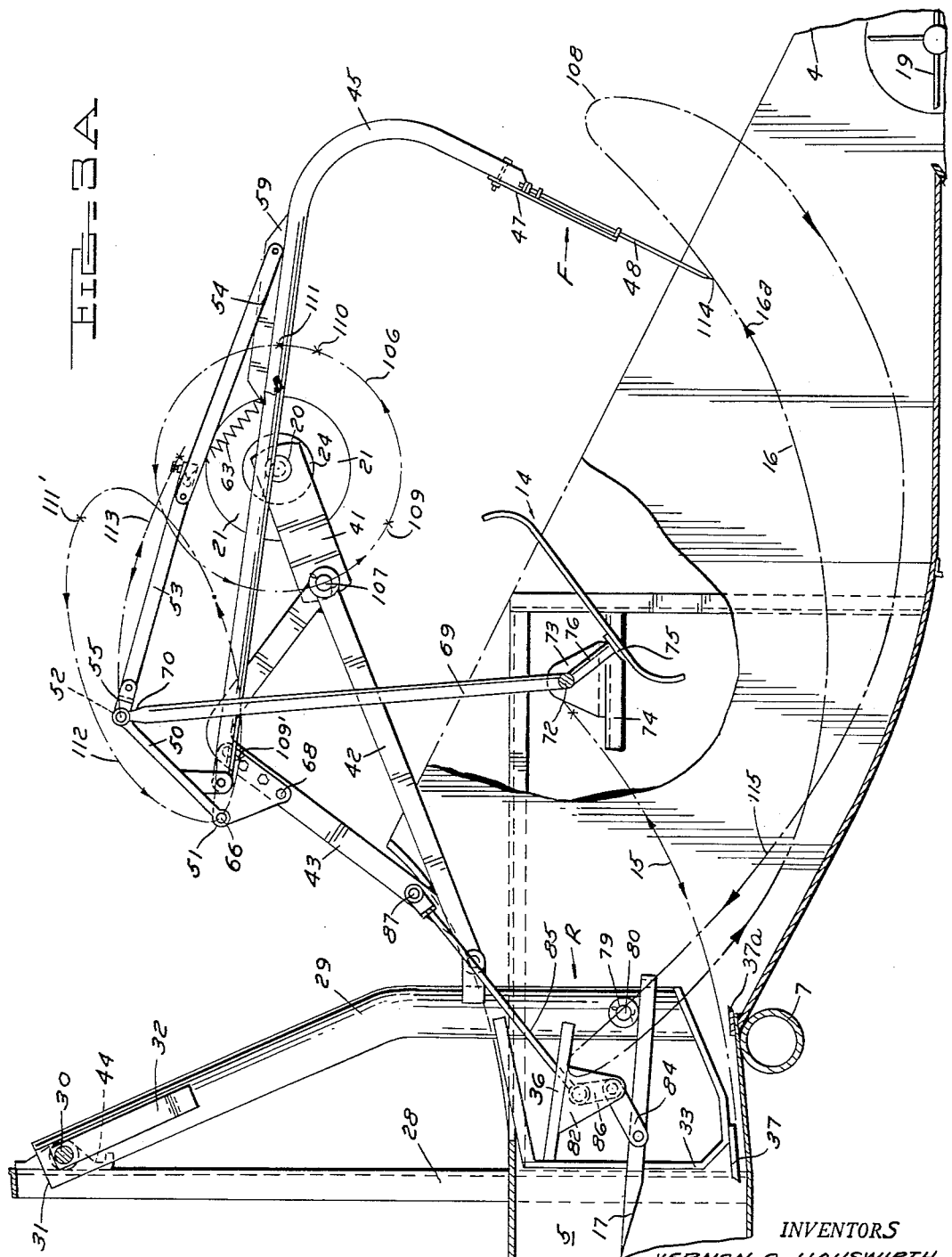

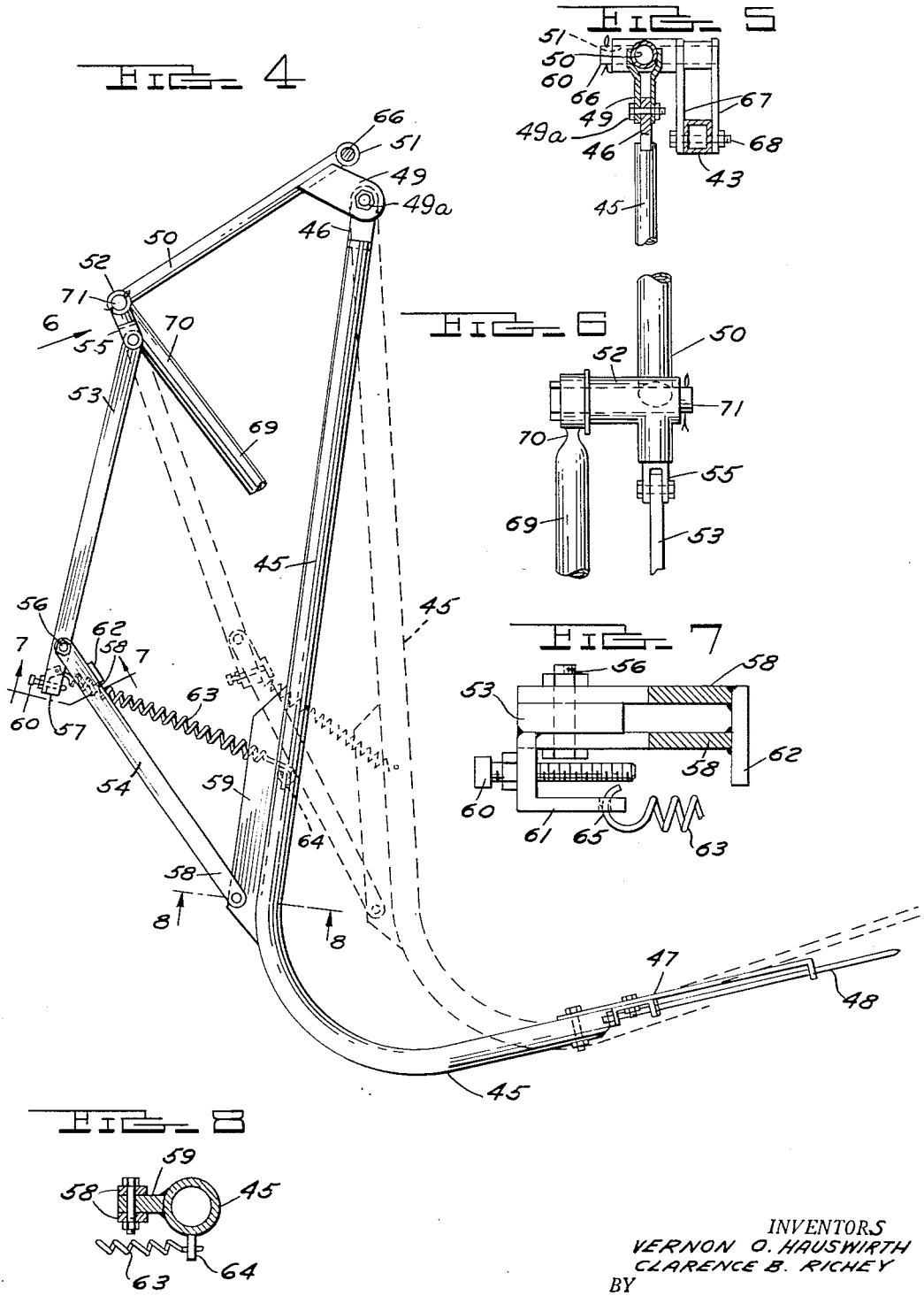

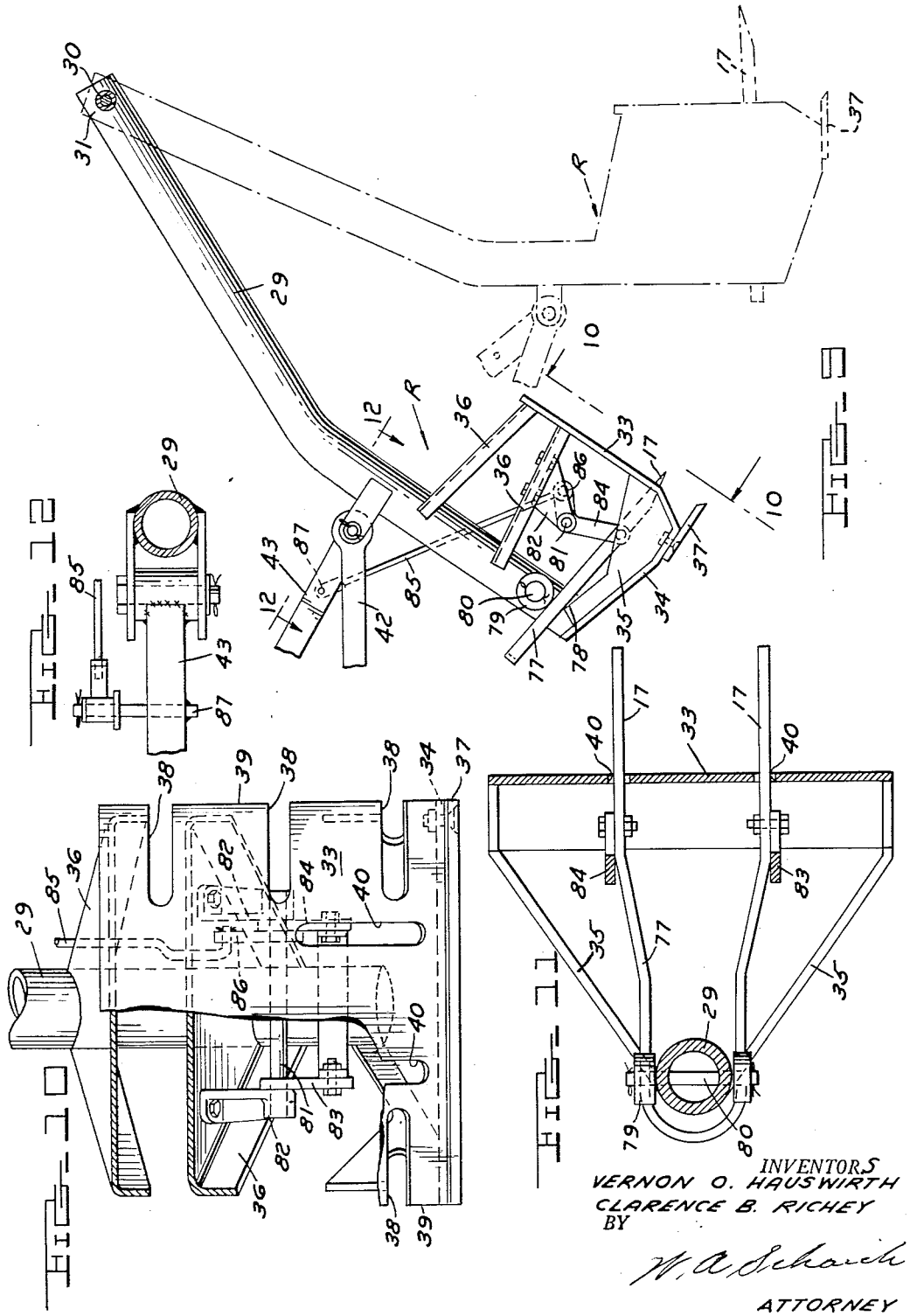

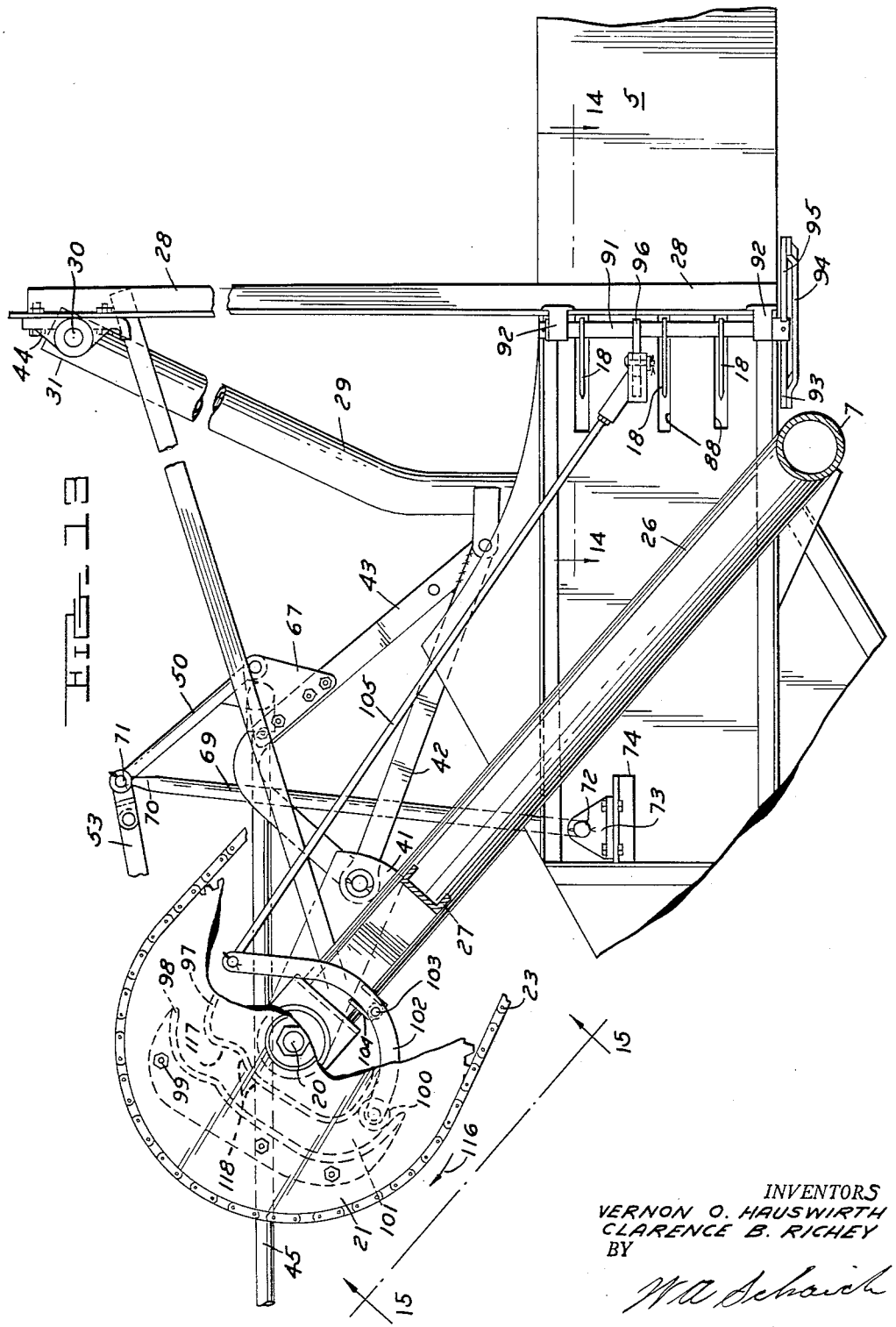

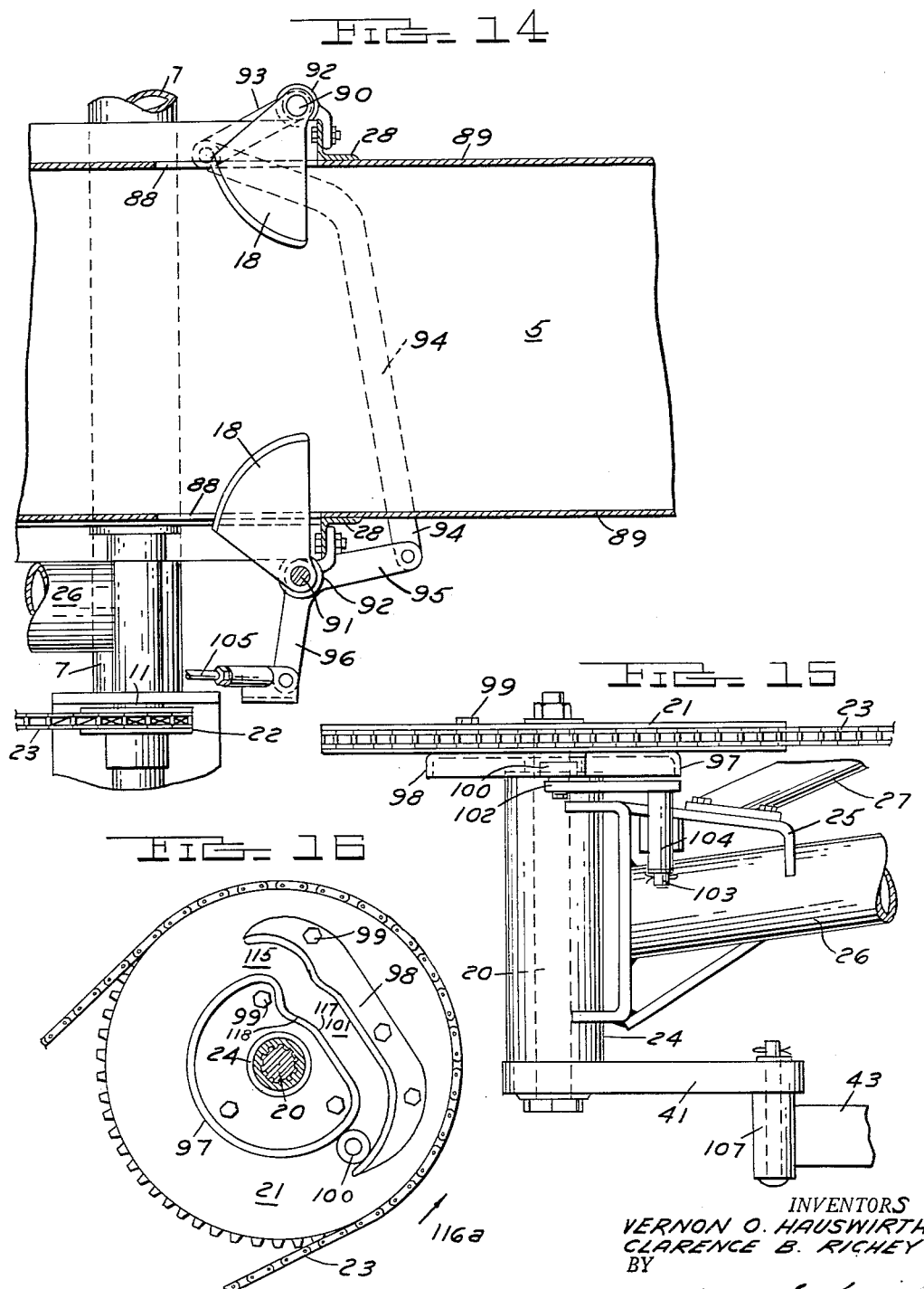

2,727,458

FEEDING AND COMPRESSING MECHANISM FOR BALING MACHINES

Vernon O. Hauswirth and Clarence B. Richey, Royal Oaks, Mich., assignors, by mesne assignments, to Ford Motor Company, Dearborn, Mich., a corporation of Delaware Application October 20, 1951, Serial No. 252,346

7 Claims. (Cl. 100—189)

This invention relates to improvements in the construction and operation of parts which comprise the feeding and compressing mechanism for a baling machine—these parts essentially consisting of a feeding fork which operates to deliver material from the header of the machine into the path of an oscillating ram which in turn delivers and compacts the material in the baling or compression chamber of the machine.

The invention is particularly directed to improving the operation of baling machines of what may be termed the straight-line type where the material to be baled follows a substantially straight path from the header of the machine through the baling chamber thereof. In the machine of the invention the major component parts of the feeding and compressing mechanism are mounted above the header and baling chamber of the machine to follow oscillatory paths of motion substantially along the longitudinal axis of the machine. Such an arrangement presents a problem in providing a mechanism which will accomplish the desired results but yet which is compact, rigid without requiring a complicated frame structure, and at the same time is one which employs a simple driving arrangement.

In addition to the feeding fork and compressing ram previously mentioned, the complete mechanism must include a means for gating the mouth of the baling chamber to retain a charge of material packed therein while the ram is withdrawn to receive a successive charge from the feeding fork.

The end results attained from the invention are chiefly an improved feeding and compressing action, including a more uniform cross-sectional distribution of material in the baling chamber, and a lowered and more constant power requirement for motivating a feeding and compressing mechanism of given capacity.

These results are secured from the effect of the combination of a number of factors, principally, the provision of a feeding fork having a feeding stroke which extends across the major portion of the path of travel of the ram; the provision of a figure 8 path of motion for the fork so that it falls away from the material delivered into the path of travel of the ram; the provision of a set of material lifting fingers carried by the ram and operating on the compression stroke thereof to take material from the fork and raise it in the baling chamber, improving the distribution of material therein and reducing the shearing load on the ram; the provision of a guide which acts to funnel material from the header into the path of travel of the ram and which preferably is driven with an oscillating motion to facilitate this funneling action; the provision of means to prevent the feeding fork from being overloaded on its feeding stroke, this means acting as a safety factor to prevent damage to the fork; the provision of slow compression and fast return strokes for the ram; the provision of a quick feeding and slow return strokes for the fork which results in the fork traveling at greater velocity during its feeding stroke to thereby distribute its material more uniformly in the path of travel of the ram; and, the provision of a simplified driving mechanism which results in all the component parts being actuated by the rotation of a single shaft.

The accompanying drawings show the improved mechanism of the invention in relation to the principal associated parts of a baling machine of the straight line type and comprise the following views:

Figure 1. A side elevation of a portion of a baling machine including the header, feeding and compressing mechanism, and mouth of the baling chamber thereof, and showing the machine in relation to a conventional tractor by which it is propelled and powered.

Figure 2. A plan view of a portion of the machine of Fig. 1 and including the header (in phantom), feeding and compressing mechanism and mouth of the baling chamber. In this view the parts of the feeding and compressing mechanism are shown in the relative positions occupied when the ram is at the end of its compression stroke.

Figure 3. A side elevation taken along the line 3—3 of Figure 2 to show the feeding fork, ram and associated parts, these being indicated in full line with the ram at the end of its compression stroke, and in phantom with the ram at the end of its return stroke.

Figure 3a. A side elevation similar to Figure 3 but viewing the parts from the opposite side of the machine. This view is intended as a schematic representation of the ram, feeding fork and associated parts to show their relative paths of movement throughout a complete feeding and compressing cycle.

Figure 4. A side elevation on an enlarged scale showing the construction of the feeding fork.

Figure 5. An enlarged detail of the pivotal mounting of the feeding fork taken along the line 5—5 of Figure 3.

Figure 6. An enlarged detail of the connection between the feeding fork and its reaction link taken in the direction of the arrow 6—Figure 4.

Figure 7. An enlarged detail taken along the line 7—7 of Figure 4.

Figure 8. An enlarged detail taken along the line 8—8 of Figure 4.

Figure 9. A side elevation of the compressing ram showing the mounting and operation of the lifting fingers thereof.

Figure 10. An end elevation of the pressure plate of the ram taken in the direction of the arrows 10—10 of Figure 9.

Figure 11. A cross sectional view of the construction of the pressure plate of the ram taken along the line 11—11 of Figure 3.

Figure 12. An enlarged detail view showing the interconnection of the ram and its connecting rod taken along the line 12—12 of Figure 9.

Figure 13. An enlarged side elevation showing the mouth of the baling chamber of the machine, the gating means and the means for actuating same, driven from the main shaft of the mechanism.

Figure 14. A sectional plan view of the gating means taken along the line 14—14 of Figure 13.

Figure 15. A plan view of the main drive shaft of the mechanism taken along the line 15—15 of Figure 13.

Figure 16. A side elevation of the drive cam for the gating mechanism taken along the line 16—16 of Figure 2.

As shown on the drawings: Referring to Figures 1, 2, 3 and 3a, the baling machine is adapted to be connected to the tractor 1 by a suitable hitch 2 carried at the forward end of a main longitudinal frame member 3. The body of the machine, which comprises a header 4 and a baling chamber 5, is carried between a pair of supporting wheels 6 upon a main transverse frame member 7.

Power to drive the operating parts is supplied from the power take-off 8 of the tractor through a suitable shaft 9, to a gear box 10 which transmits the rotation of the longitudinal shaft 9 into rotation of a transverse shaft 11 (Figure 2). A standard type of pickup device 19 (Figure 3a) is mounted at the forward end of the header 4 and driven from the transverse shaft 11 by suitable pulleys 12 and a belt 13.

Four of the principal component parts of the feeding and compressing mechanism are shown in Figure 3a and comprise a ram assembly R, a feeding fork assembly F, a guide 14 located adjacent the path of travel of the ram (indicated by the broken line and arrow 15) and above the path of travel of the fork (indicated by the broken line 16), and material lifting fingers 17 carried by the ram assembly R. For the sake of clarity, the fifth component part, namely gating members 18 for closing the mouth of the baling chamber after the ram has been withdrawn therefrom, are shown separately in Figures 13 and 14. All of these major component parts of the feeding and compressing mechanism are motivated through the rotation of a main shaft 20 which is equipped with a driving sprocket 21 and is driven from the sprocket 22 on the transverse shaft 11 by a chain 23. Main shaft 20 is mounted in a large bearing 24 which in turn is carried by bracket members 25 (Figure 2) secured to the upper end of a main bearing post 26. The lower end of the bearing post 26 is attached to the main transverse frame member 7 of the machine, and further support for this structure is provided by a brace 27 extending between the main frame member 7 and one of the bracket members 25.

The construction of the five main component parts will be first described followed by a discussion of the manner in which these parts are motivated through the rotation of the main shaft 20, and the manner in which they jointly operate to produce the desired results.

Ram assembly

The ram assembly, which is mounted between a pair of upright frame members 28, consists of a main arm 29 having a pivot shaft 30 connected to its upper end 31, the position of this shaft 30 being additionally fixed by a pair of braces 32 (Figure 2). Figures 9 through 12 show the construction of the ram assembly in detail. A pressure plate 33 is secured to the lower end of the ram arm 29 by a triangulated structure consisting of a bottom member 34, lower side plates 35, and bracing plates 36. A cutting knife 37 is secured to the bottom plate 34 and cooperates with stationary knife 37a, which is fixedly secured to the lower inner portion of the entrance to the baling chamber 5 and above the transverse frame member 7, to shear the hay trailing below the ram. The pressure plate 33 is formed with a plurality of notches 38 (Figure 10) which extend inwardly from each side 39 of the plate. Two slots 40 are also formed in the face of the plate spaced inwardly from the adjacent notches 39 and located substantially equidistant from the center line of the plate.

The ram assembly is oscillated on its compression and return strokes by being connected (Figure 3a) to a crank 41, keyed to the inboard end of the main shaft 20, by a connecting rod composed of a straight member 42 and a V-shaped member 43, which oscillation takes place about a pivot defined by a bearing 44 supporting each end of the pivot shaft 30, these bearings being carried by the vertical frame members 28.

Feeding fork assembly

The principal member of this assembly (Figures 4 to 8) is an L-shaped main arm 45 having a tongue 46 secured to one end, and carrying a plate 47 and plurality of tines 48 on its other end. The tongue end of this main arm 45 is pivotally secured between a pair of plates 49 carried by a supporting strut member 50 by bolt means 49a. A main bearing 51, for the entire feeding fork assembly, is secured to one end of the strut member 50 while a reaction link bearing 52 is provided at the other end of strut 50. The feeding fork assembly includes a collapsible or toggle link composed of an upper member 53 and a lower member 54. Upper member 53 is pivotally connected to a clevis 55 attached to the reaction link bearing 52, and pivotally connected at a position inwardly from its other end 57, to the lower link 54 by a bolt 56. Lower link 54 is composed of a pair of parallel bars 58 (Figure 7) and is connected to a rib 59 which re-enforces the main fork arm 45. The locked position of this toggle link is defined by the engagement between a set screw 60 carried by an L-shaped bracket 61 at the end of the upper link 53 and a stop piece 62 secured to the parallel bars 58 of the lower link 54. A spring 63 extends between a lug 64 carried by the main arm 45 and a hole 65 provided in the L-shaped bracket 61.

The main bearing 51 of the feeding fork assembly is mounted upon a pin 66 (Figures 2 and 5) carried between a pair of supporting plates 67 which in turn are attached to the V-shaped connecting rod member 43 by a series of bolts 68. Movement of the feeding fork assembly about its main bearing 51 is a function of the relative motion between the connecting rod member 43 and the framework of the machine as defined by a reaction link 69 having its free end 70 secured (Figure 6) to the reaction link bearing 52 by a pivot pin 71 and having its fixed end attached (Figure 3a) to a cross shaft 72 which is pivotally mounted between a pair of bearings 73 carried by a supporting frame member 74 located at either side of the header of the machine.

Guide members

Guide members 14 (see Figures 2 and 3a) consist of a series of spaced S-shaped bars connected to a transverse member 75, in turn connected by crank arms 76 to the cross shaft 72 which supports the reaction link 69. Thus, any motion of the shaft 72 will impart motion to the guide bars 14.

Lift fingers

These fingers 17 are carried by the ram assembly and hence are best shown in Figures 9 through 11. They are formed by the extremities of a U-shaped member 77 which extends around the back of the ram arm 29 and which is loosely fitted between a surface 78 of the ram side plates 35 and a pair of guide rollers 79 which are mounted upon a pin 80 passing through the ram arm 29. The fingers 17, which extend through the slots 40 formed in the pressure plate 33 of the ram assembly, are supported from a cross shaft 81, carried between a pair of brackets 82 secured to the intermediate brace plate 36 of the ram assembly, by a pair of cranks, one crank 83 being of plain type, and the other 84 being of bell-crank type. A link 85 is pivotally secured between the end of the actuating arm 86 of the bell-crank 84 and a pivot point 87 on the connecting rod member 43 and thus motion is imparted to the fingers 17 as the result of relative movement between the connecting rod and ram arm 29.

Gating members

The gating members 18, shown in their closed position in Figure 14, extend in this position into the baling chamber 5 through slots 88 formed in the side plates 89 of the machine. These members are attached to right and left hand vertical shafts 90 and 91 respectively, each shaft being carried (Figure 13) on the side of the machine between a pair of bearings 92. A crank 93 is secured to the lower end of the right hand shaft 90 and is cross connected by a link 94, which extends under the bottom of the baling chamber 5, to a crank 95 similarly carried on the lower end of the left hand shaft 91. Shaft 91 carries a second crank 96 and actuation of the gating members 18 occurs in response to movement of this crank 96.

This movement is controlled by a double cam (Figure 16) consisting of a semicircular member 97 and a complementary member 98, each being connected to the inner face of the driving sprocket 21 by bolts 99. A roller follower 100, adapted to ride in the cam track 101 formed between the adjacent surfaces of the members 97 and 98, is carried on one end of a lever arm 102 (Figure 13). Lever arm 102, intermediate its ends, carries a pivot pin 103 which engages a bearing 104 mounted on one of the main bearing bracket members 25, and has its other end attached to a link 105 extending between the crank arm and the crank 96.

*Feeding and compressing action*

Referring to Figure 3a, the major component parts, with the exception of the gating fingers 18, are there shown in their relative positions at the end of a compression stroke of the ram. At this time, the feeding fork F is still on its return stroke as can be seen from its position along its orbit of travel indicated by the line 16 and the direction of its travel around this orbit as indicated by the arrows 16a. Thus as the crank 41 continues its counterclockwise rotation, as indicated by the path of travel 106 of the bearing 107 between the crank and connecting rod, the fork F will continue on its return stroke to an end point 108 located substantially above the pickup device 19 at the forward end of the header 4. When the fork reaches the end of its return stroke, the connecting rod bearing 107 will have rotated to the point marked 109 along its path of travel 106, and, as the fork begins its feeding stroke, the ram will continue moving on its return stroke which ends when the connecting rod bearing 107 reaches point 110 along the path of its travel 106. It is to be noticed that the spacing between point 110 and the position of bearing 107 shown, is considerably less than 180°, so that the ram operates at a greater rate of travel on its return stroke than during its compression stroke.

After the connecting rod bearing 107 passes point 110 and the ram begins a compression stroke, the fork F is still on its feeding stroke which began back at point 109 and which continues until the bearing 107 reaches point 111 on its path of travel 106. Crank rotation from point 111 through the remaining 360° back to the full line position of the parts, accomplishes the remainder of the compression stroke of the ram and the major portion of the return stroke of the fork. Thus in terms of degrees of travel of the crank 41, the ram operates on long compression—quick return strokes, while the fork operates on quick feeding—slow return strokes. The short feeding of the fork is not equal to the quick return of the ram, however, but rather there is an overlapping of strokes, particularly advantageous where the ram compression stroke begins before the fork has completed its feeding stroke.

The path of motion of the feeding fork is determined by the location of the main bearing 51 of the feeding fork assembly and the resulting location and form of the orbit of travel 112 thereof, together with the location of the reaction link bearing 52, which oscillates back and forth along an arcuate path 113. These bearings have been located to give a fork feeding stroke which extends well into the path of travel of the ram, and one in which the fork tip 114 describes a figure 8 path of motion. With this type of motion the fork tip follows a reverse loop 115 at the end of its feeding and beginning of its return stroke which facilitates the disengagement of the fork from the material which it has delivered into the path of ram travel.

Since the ram and feeding fork are the main parts of the mechanism, their mode of operation is mainly responsible in determining the power which must be supplied to the shaft 20 in order to drive the mechanism through one cycle. The mode of operation of these parts described herein results in a lowering of this over-all power requirement and also results in a more uniform power requirement over an operating cycle. Lengthening the compression stroke of the ram obviously reduces the peak power requirement. Overlapping the respective strokes of the ram and fork make the power requirement more uniform as does the provision of a fast feeding stroke for the fork occurring principally during the quick return stroke of the ram.

The action of the fork during its feeding stroke is augmented by the operation of the guide members or compressors 14 which are provided primarily to funnel and precompact the material being delivered by the fork from the header of the machine into the path of the ram. In the particular construction disclosed, this action of the guide members is improved as a result of their oscillating motion. Referring to Figure 3a, it can be seen that this motion results from the oscillating motion of the reaction link 69. When the parts are in the position shown, where the feeding fork is approaching the end of its return stroke and about to begin its feeding stroke, the guide members 14 are upwardly inclined toward the front of the machine. During the feeding stroke, the angle of inclination of the guide members progressively decreases, and at the same time the guide members are moving with the feeding fork towards the path of travel of the ram. The guide members have thus what might be termed a walking action during the feeding stroke of the fork.

Any baling machine, and particularly one of the type disclosed, presents the problem of achieving the greatest possible transfer of material from the feeding member to the compressing member and a further problem of distributing this material as evenly as possible over the vertical cross section of the baling chamber so that the density of the finished bales will be uniform from top to bottom.

The lift fingers 17 mounted on the present ram assembly and operating in conjunction therewith, act to scoop material from the fork and elevate this material in the baling member. Referring to Figure 9, which shows the ram in full line at the end of its return stroke, it can be seen that the fingers 17 occupy a position where they are substantially withdrawn within the pressure plate 33 of the ram and lie adjacent the lower edge or cutting knife 37 thereof. During the compression stroke of the ram, the action of the link 85 and the bell crank 84 causes the fingers 17 to be gradually extended through the pressure plate 33 and simultaneously raised until they occupy a position shown in Figure 3a at the end of the charging stroke. The fingers thus act to scoop material from the fork into the path of the ram, and simultaneously lift this material vertically in the baling chamber. This lifting of the material incidentally results in reducing the amount of material in the path of the ram cutting knife 37 and cooperating knife 37a, thereby lowering the shearing load.

As the ram ends its compression stroke, all the material which has been delivered and compressed within the baling chamber must be retained in compressed position before the ram is withdrawn to start a new cycle and this function is performed by the gating members 18. In order to further reduce the power requirement, these members are directly driven from the main shaft 20 through the operation of the cam track 101, lever arm 102, and connecting link 105 in a manner which will be briefly described. In Figures 13, 14 and 15, these parts are shown in the position they occupy when the ram has reached the end of its compression stroke. The direction of rotation of the sprocket 21 in Figure 13 is clockwise as indicated by the arrow 116 (counterclockwise in Figure 16 as indicated by the arrow 116a). Thus, as the ram operates through its return stroke and the first part of the following compression stroke, the cam follower 100 moves around the circular part of the cam plate 97, and the gate members 18 are held in the extended position shown in Figure 14. As the follower 100 enters the track 101 between the members 97 and 98, the radius abruptly changes along the portion 117, the cam follower is moved toward the center of shaft 20 (Figure 13), link 105 is moved downwardly, cranks 96 and 95 (Figure 14) are rotated in a counterclockwise direction, crank 93 in a clockwise direction, and the members 18 are retracted from the baling chamber through the slots 88 in the sides thereof. The members 18 are held in this retracted position while the follower 100 moves along the portion 118 of the cam track which is concentric with the axis of the shaft 20, and then are gradually moved to extended position to follow the motion of the ram in compacting material in the baling chamber. During this movement to extended position, the members 18 pass between the notches 38 in the pressure plate 33 of the ram.

In the practical operation of a baling machine, material is rarely deposited by the pickup device 19 upon the header of the machine at a uniform rate. Occasionally, large quantities are deposited which are in excess of the normal capacity of the operating parts, causing an overload which often results in a jamming of material, stalling the machine or breaking some part of the mechanism. In recognition of this fact, the usual practice in the design of baling machines requires that the parts, particularly the feeding fork, be made sufficiently strong to withstand these occasional overloads, to the point of stalling. With the present construction, however, this requirement is substantially reduced by the automatic overload release incorporated in the construction and operation of the feeding fork, which not only acts to prevent damage to the fork, but which contributes materially to the elimination of jamming and stalling, and yet insures that an adequate amount of material will be delivered by the fork to the ram during each normal cycle of operation.

If an overload condition occurs with the present construction, further feeding motion of the fork will be arrested by the breaking of the upper toggle links 53 and 54 of the fork assembly (Figure 4), and once these links have broken the main fork arm 45 is free to rotate about its point of pivotal connection to the strut 50. Further positive feeding movement of the fork assembly will cease upon the breaking of the toggle joint and the assembly will be inoperative until automatically reset as a result of the load on the fork being reduced sufficiently to allow the toggle links 53 and 54 to again be brought to locked position by the spring 63. This will occur as a result of the compressing action of the ram, and the movement of the parts through their cycle until the feeding fork is again on its return stroke. If the overloaded condition is not relieved through further normal operation, the amount of material delivered to the header of the machine can be reduced by either stopping or reducing forward motion of the machine. Obviously the amount of overload required to break the toggle joint and stop further feeding action of the fork assembly depends upon the setting of the adjusting screw 60 and/or the tension of the resetting spring 63.

This overload release action of the fork assembly is augmented by the walking action of the guide members 14, in preventing any severe jamming of material in the path of travel of the fork, and the overload release alone prevents the feeding of such a charge of material as would cause jamming in the path of travel of the ram.

We claim:

1. Feeding and compressing mechanism for a baling machine having a baling chamber, comprising a main shaft, a crank adapted to rotate therewith, a pivoted compressing ram, means for driving said ram on a compression and return stroke by rotation of said crank, a feeding fork movable into and out of said baling chamber along a path extending from beneath and intersecting the path of said ram, means for driving said feeding fork on a feeding and return stroke, shiftable material engaging tines carried by said ram, and means for moving said tines in an upward direction relative to the vertical cross section of said baling chamber during the compression stroke of said ram.

2. The invention set forth in claim 1 wherein the means for driving said ram comprise a connecting rod pivotally secured to said ram and to said crank, and said means for moving said tines comprises a linkage operable in response to relative movement between said ram and said connecting rod.

3. For use in a baling machine having a substantially horizontally extending baling chamber, a ram assembly movable on a compression stroke into the mouth of said baling chamber and said ram assembly including a pressure plate adapted to contact the material compressed in said baling chamber by the action of said ram; means to improve the vertical distribution of material compressed in said chamber comprising a tine-like member carried by said ram assembly and adapted to project from the pressure plate thereof through an aperture therein, said tine-like member being mounted for movement outwardly of the face of said pressure plate and upwardly relative to the vertical cross section of said baling chamber, and means for imparting such outward and upward movement to said member continuously during the compression stroke of said ram assembly and imparting a downward and inward movement to said member during the return stroke of said ram assembly.

4. The invention set forth in claim 3 wherein said ram assembly further includes a crank having one end pivotally connected to the structure of said assembly and the other end connected to said tine-like member, and said means for moving said tine-like member includes means for imparting an oscillating motion to said crank.

5. In a baling machine having a bale forming chamber, a compressing ram pivotally mounted above the mouth of said baling chamber for arcuate movement into the mouth thereof from a point above and in advance of such mouth, a material feeding fork, means for moving said fork on a feeding stroke along a path extending from below and intersecting the path of said ram when the latter is withdrawn from the mouth of said baling chamber, and means for assisting the transfer of material from said fork into said bale forming chamber comprising shiftable material engaging tines carried by said ram, and means for extending said tines outwardly and upwardly from the pressure plate of said ram during the compression stroke thereof.

6. Feeding and compressing mechanism for a baling machine comprising a pivotally mounted ram adapted to be oscillated on charging and return strokes by motion of a crank and connecting rod, a feeding fork assembly comprising a member pivotally mounted on said connecting rod, a main fork arm pivotally carried by said member, a collapsible and extendable toggle linkage pivotally connected between said member and said main arm in substantially triangular relationship therewith when in extended position, and resilient means normally urging said toggle linkage to extended position but permitting collapse of said toggle linkage when said feeding fork encounters an obstruction.

7. The invention set forth in claim 3 further characterized by said ram assembly being driven by a crank and connecting rod, said last mentioned means comprising a bell crank carried by said ram assembly, said tine-like member being attached to one end of said bell crank, and a reaction link extending between the other end of said bell crank and a point on said connecting rod.

References Cited in the file of this patent

UNITED STATES PATENTS

| Re. 13,571 | Bellinger | June 10, 1913 |
| 797,071 | Page et al. | Aug. 15, 1905 |

(Other references on following page)

UNITED STATES PATENTS

| | | |
|---|---|---|
| 818,779 | Nixon | Apr. 24, 1906 |
| 1,045,125 | Dain | Nov. 26, 1912 |
| 1,825,600 | Nichols | Sept. 29, 1931 |
| 1,830,623 | Rollman | Nov. 3, 1931 |
| 1,998,166 | Nelson | Apr. 16, 1935 |
| 2,366,426 | Robinson | Jan. 2, 1945 |
| 2,413,522 | Russell | Dec. 31, 1946 |
| 2,552,888 | Druetta | May 15, 1951 |
| 2,633,691 | Lytle | Apr. 7, 1953 |

FOREIGN PATENTS

| | | |
|---|---|---|
| 682,726 | Germany | May 6, 1940 |